United States Patent

[11] 3,592,993

| [72] | Inventor | Moreland P. Bennett<br>Pittsfield, Mass. |
|---|---|---|
| [21] | Appl. No | 841,835 |
| [22] | Filed | July 15, 1969 |
| [45] | Patented | July 13, 1971 |
| [73] | Assignee | General Electric Company |

[54] METHOD OF JOINING ALUMINUM TO ALUMINUM
3 Claims, 5 Drawing Figs.

[52] U.S. Cl. .................................................. 219/93,
219/85, 1/118
[51] Int. Cl. .................................................. B23k 11/16
[50] Field of Search .................................. 219/92—94, 118, 85

[56] References Cited
UNITED STATES PATENTS

| 3,121,785 | 2/1964 | Terrill | 219/92 |
| 3,214,564 | 10/1965 | Katzer et al. | 219/92 |
| 3,496,324 | 2/1970 | Harper | 219/93 |

Primary Examiner—J. V. Truhe
Assistant Examiner—J. G. Smith
Attorneys—Francis X. Doyle, Frank L. Neuhauser, Oscar B. Waddell and Joseph B. Forman

ABSTRACT: A welded joint having good electrical and mechanical characteristics is obtained between aluminum members by using a copper or copper alloy cloth or screen between the members to the joint. Heat and pressure are applied through resistance electrodes to melt the small wires of the screen and cause the aluminum metal to bond together.

Inventor,
Moreland P. Bennett,
by Francis K. Doyle
His Attorney.

Inventor,
Moreland P. Bennett,
by Francis K. Doyle
His Attorney.

METHOD OF JOINING ALUMINUM TO ALUMINUM

BACKGROUND OF THE INVENTION

This invention relates to a bonded joint and more particularly to a bonded joint between two aluminum members and the method of making such joint.

In the electrical apparatus field the use of aluminum strip material to form coils has become widely used throughout the industry. Due to the nature of coil windings, it often becomes necessary to splice the start of one roll of aluminum strip to the end of another roll of aluminum strip. Also, in the manufacture of coils, it is necessary to attach terminal members to one or more portions of aluminum strip. Where such terminals are aluminum material, it is necessary to provide a strong electrical joint between the aluminum members. Of course, the same type of joint is necessary where joining one end of a roll of aluminum strip to another roll of aluminum strip.

In general, the bonding of one aluminum member to another by welding has been found unsatisfactory due to expulsion of aluminum from the joint. The inability to obtain a consistently strong uniform joint of good electrical characteristics has been often noted during the welding of aluminum to aluminum.

It has been found that a consistently strong, electrically sound, joint can be made by using a copper or copper alloy screen or cloth between the members to be joined and applying sufficient heat and pressure to melt the small screen wires and cause the mating aluminum surfaces to flow together to obtain a bond with little or no expulsion of aluminum material.

Therefore, it is one object of this invention to provide a novel method of joining aluminum to aluminum.

A further object of this invention is to provide a novel joint between two aluminum members.

A further object of this invention is to provide a novel joint using a copper or copper alloy screen or cloth between two aluminum members.

SUMMARY OF THE INVENTION

Briefly in one form, this invention comprises a method of joining two aluminum members together in which a copper or copper alloy screen or cloth is placed between the mating surfaces of the aluminum members. Heat and pressure are applied, preferably from resistance electrodes to melt the wire screen and bond the mating aluminum surfaces together. The invention also comprises the joint made by this method.

The invention sought to be protected will be particularly pointed out and distinctly claimed in the claims appended hereto. However, it is believed that this invention and the manner in which its objects and advantages are obtained as well as other objects and advantages thereof will be better understood by reference to the following detailed description of a preferred embodiment particularly when considered in the light of the accompanying drawings.

DESCRIPTION OF PREFERRED EMBODIMENT

As before mentioned, it has been discovered that a strong mechanical bond having good electrical characteristics can be formed between aluminum members by using a copper or copper alloy screen between the aluminum surfaces to be joined. Heat and pressure are applied to the joint sufficient to melt the wire screen and firmly bond the mating aluminum surfaces together.

In many instances the terms "wire cloth" and "wire screen" are used interchangeably, while at other times wire cloth is used to indicate a material made of smaller diameter wire. For purposes of this application, the term "screen" will be used to indicate all such material made of small diameter wire.

Reference will now be made to the drawings in which like numerals are used to indicate like parts throughout the various views for a more complete description of the method of this invention and the novel joint formed thereby.

Figure 1:
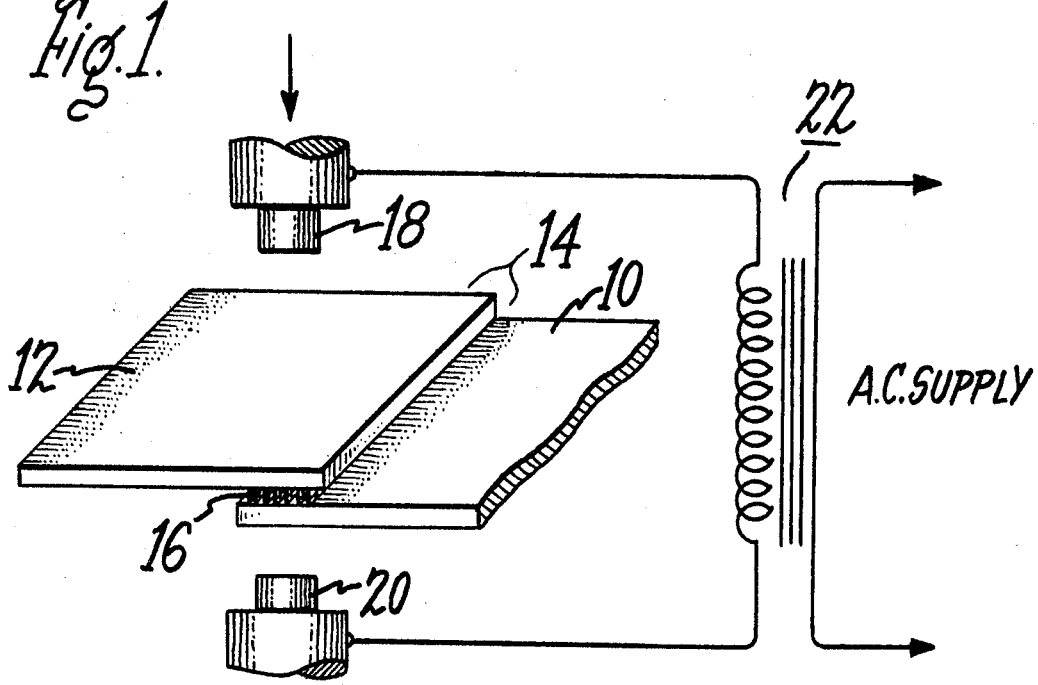
FIG. 1 is a perspective view of one method of making the joint of this invention.

Referring first to FIG. 1, a preferred method of forming the joint according to this invention is shown. In FIG. 1 a pair of aluminum strip members 10 and 12 are to be joined. The portions to be joined are overlapped as shown at 14 and a copper or copper alloy screen 16 is placed between the overlapped portions. It is preferred that the screen 16 be completely within the overlapped portion 14. A pair of carbon electrodes 18 and 20 are connected to the secondary of transformer 22 and are used to apply heat and pressure to area 14 to bond the interface of the aluminum members 10 and 12 together. Heat and pressure are applied by means of electrodes 18 and 20 sufficient to melt the wire screen 16 which causes bonding of the interface of area 14 with little or no aluminum expulsion from the joint.

In one method of performing this invention, aluminum strip 0.051 inch thick was used. The strip members were overlapped in area 14 as shown in FIG. 1 approximately 0.5 inch. A commercial bronze screen 16, approximately 90 percent copper and 10 percent zinc, was used having a wire size of 0.011 inch in diameter and a mesh of 18×16 per linear inch. The wire screen was 0.375 inch wide and tin-plated. A pair of 1 inch diameter carbon electrodes such as 18 and 20 were used and were applied to the joint with a pressure of 400 pounds and a secondary ampere rating of 3400. The electrodes were applied to the area 14 for a period of 5 seconds. Spot welds utilizing electrodes 18 and 20 were placed across the joint approximately one weld every 3 inches. The joint was subjected to electrical and mechanical test and found to be completely satisfactory for the joining of aluminum strip.

Figure 2:
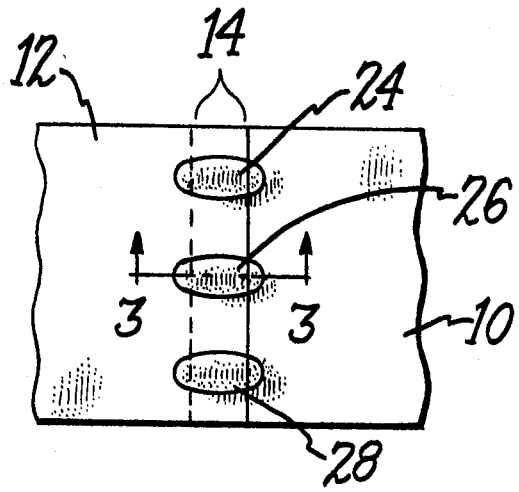
FIG. 2 is a top view of the completed joint made according to FIG. 1.

FIG. 2 shows the top view of a joint formed according to the above method. As shown, the overlapped area 14 has three spot welds 24, 26 and 28.

Figure 3:
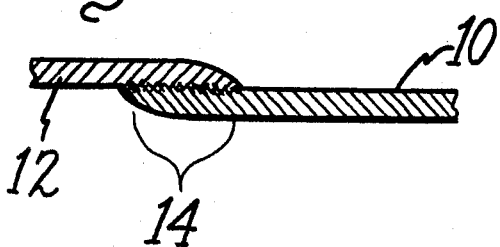
FIG. 3 is a sectional view of a portion of the joint of FIG. 2 taken on the line 3-3.

FIG. 3 is a cross section of spot weld 26 and shows that the bronze screen 16 has melted and that the interface of aluminum strips 10 and 12 have firmly bonded together.

Figure 4:
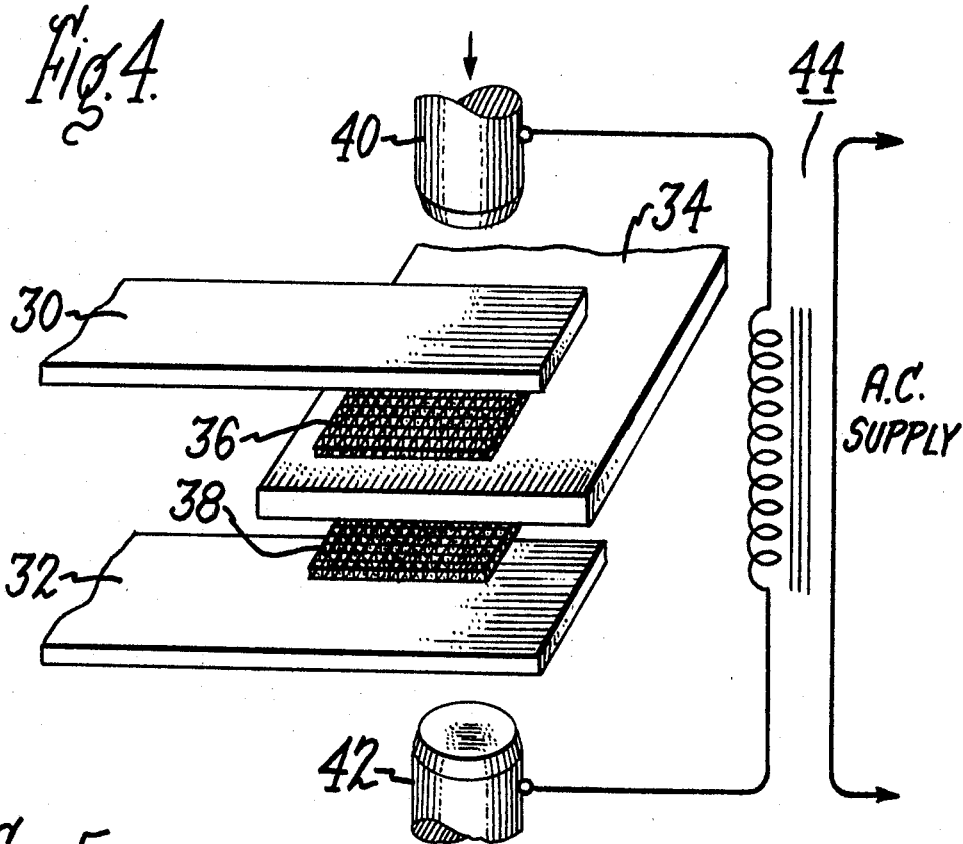
FIG. 4 is a perspective view of the method of making another type of joint according to the invention.

FIG. 4 shows a method of this invention used to secure a pair of aluminum leads 30, 32 to an aluminum strip 34. In this embodiment a copper or copper alloy screen 36 is placed between the interface of lead 30 and strip 34 while screen 38 is placed between the interface of strip 34 and lead 32. Resistance electrodes 40, 42 connected to the secondary of transformer 44 are used to apply heat and pressure to the joint as previously described. As will be understood, this method may also be used to secure the aluminum leads, such as 30, 32 to an aluminum bus bar. In one instance, aluminum leads, such as 30, 32 which had a thickness of three-eighths inch were connected to a three-fourths inch bus bar using a bronze screen and electrodes, in the manner shown in FIG. 4.

Figure 5:
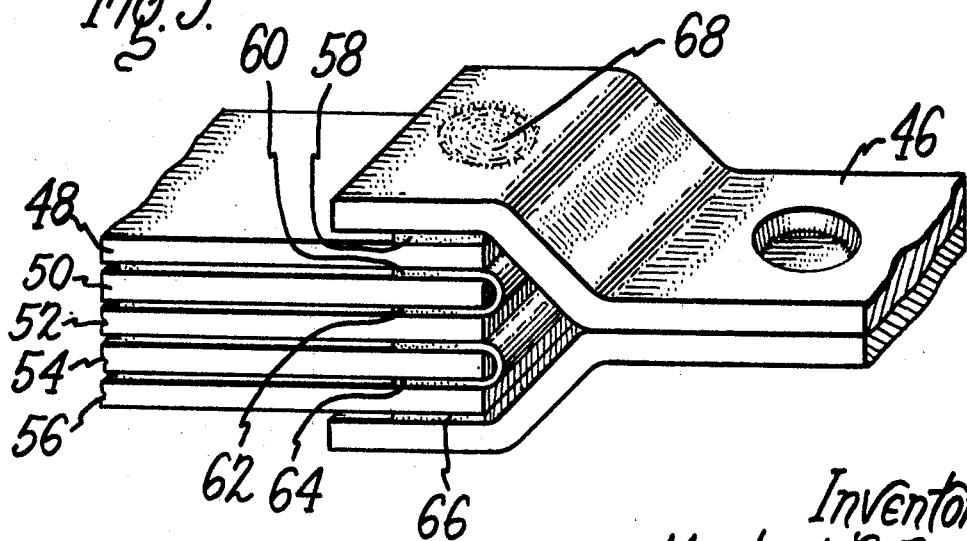
FIG. 5 is a perspective view of another type of joint according to this invention.

FIG. 5 shows another joint formed by the method of this invention in which an aluminum terminal 46 is bonded to a plurality of aluminum leads 48, 50, 52, 54, and 56. As shown, a copper or copper alloy screen 58, 60, 62, 64 and 66 is placed between the interface of the upper portion of terminal 46 and the lead 48 and between the interfaces of the various leads as well as the interface of lead 56 and the lower portion of terminal 46. A weld 68 is made by resistance electrodes in the manner previously described.

From the above description of the preferred method, it will be apparent to those skilled in this art that by means of this invention a strong mechanical bond can be formed between aluminum members having good electrical characteristics.

It will, of course, be apparent to those skilled in the metal joining art that various changes may be made without departing from the spirit and scope of this invention.

What is claimed as new and which it is desired to secure by Letters Patent of the United States is:

1. A method of joining aluminum members together comprising the steps of:
    a. overlapping the aluminum members to be joined,
    b. placing between said overlapped members a copper or copper alloy screen,
    c. applying resistance heat and pressure to melt said screen forming a copper alloy and aluminum bond to said members together at the interface of said overlapped members.

2. A method of joining aluminum members as set forth in claim 1 in which said overlap is at least 0.5 inch and said screen is smaller than said overlap.

3. A method of joining aluminum members as set forth in claim 1 in which said screen is tin-plated.